No. 637,072. Patented Nov. 14, 1899.
H. BLUMENBERG, Jr. & F. C. OVERBURY.
ELECTRIC BATTERY.
(Application filed Mar. 13, 1899.)

(No Model.)

Witnesses
Chas. H. Smith
Geo. T. Pinckney

Inventors
Henry Blumenberg Jr.
Frederick C. Overbury
per L. W. Serrell & Son
Attys

UNITED STATES PATENT OFFICE.

HENRY BLUMENBERG, JR., AND FREDERICK C. OVERBURY, OF NEW YORK, N. Y.

ELECTRIC BATTERY.

SPECIFICATION forming part of Letters Patent No. 637,072, dated November 14, 1899.

Application filed March 13, 1899. Serial No. 708,793. (No model.)

*To all whom it may concern:*

Be it known that we, HENRY BLUMENBERG, Jr., residing at the city of New York, borough of Bronx, county of Westchester, and FREDERICK C. OVERBURY, residing at New York, in the county of New York, State of New York, citizens of the United States, have invented an Improvement in Electric Batteries, of which the following is a specification.

Carbon has been made use of extensively for one electrode in a battery, and in some instances the active material has been placed in a cup. We have discovered that where the cup is of carbon and the conductor is connected with that carbon in the ordinary way by a plug of soft metal and at one side of the rim of the cup the current generated in the battery passes by the shortest route to the end of the conductor at its connection with the carbon cell, and hence there is oxidation and decomposition and unequal action in the battery.

The object of the present improvement is to unify the action in the cell and at the same time to effectually prevent injury to the conductor at the point of contact of the same with the carbon electrode.

In carrying out our invention we make use of a carbon cup and pass the conductor down through a hole in the rim of the cup, such hole being large enough for the metal winding upon such metal and the tube of india-rubber forming a casing, and the conductor and the tube of rubber are passed along through a channel in the bottom of the carbon cup and the end of the wire is connected to the carbon cup near the center of the bottom by a plug of lead and an inclosing non-conducting cement, and we find it advantageous to fold the wire of the conductor backward and forward before passing it into the hole and before casting upon the same the plug of lead by which the parts are connected. In this manner the electric action is unified, the resistance of the battery reduced to a minimum, and the conductor and its connection to the carbon cell are effectually protected.

Figure 1:
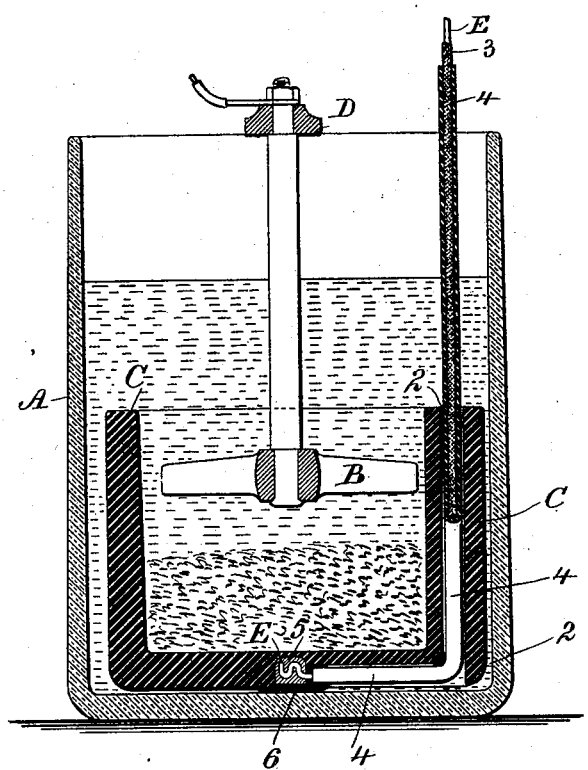
Figure 2:
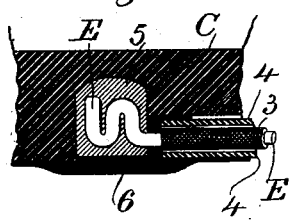
Figure 3:
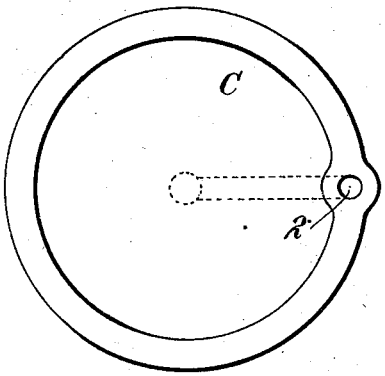

In the drawings, Figure 1 is a vertical section of a battery-cell with the present improvement applied. Fig. 2 is a magnified section of the connection between the end of the conductor and the carbon electrode, and Fig. 3 is a separate plan of the carbon cup.

The jar A is of ordinary character, usually of glass, and the carbon electrode C is in the form of a cup of suitable size and thickness introduced within the jar A, and the other electrode, usually of zinc, is illustrated at B as suspended from the cross-bar D upon the top of the jar A. At one side of the carbon electrode a hole 2 is made vertically through the rim of such electrode, and at this point it is advantageous to make the electrode thicker, and this hole is sufficiently large for the conductor E, with the wound covering 3 and the small rubber tube 4, to pass freely through the hole, and there is a channel in the bottom of the carbon electrode, preferably passing radially and sufficiently large for receiving the conductor and its inclosing insulating material and tube, and a hole is made up from below into the bottom of the carbon electrode, which hole is sufficiently large to receive the end of the conductor E, and it is advantageous to fold the wire of the conductor E backward and forward before entering the same into the hole, and then a plug of lead 5 or similar material is cast into the hole in the carbon electrode and around the end of the conductor E, and this plug may be calked or otherwise tightened into the hole, so as to make a firm connection, and the end of the tube 4 comes up close against the plug of lead 5, and resinous material is to be applied at 6 around the rubber tube at its end and over the plug of lead and along the channel in the bottom of the carbon electrode, so as to thoroughly insulate the conductor, except at the end, where it is connected by the plug of lead or similar material directly to the carbon electrode, and by this construction all liquid or oxidizing or destructive substances are kept away from the conductor, so that the connection and the conductor are preserved, and it is remarked that the rubber tube 4 should extend above the top of the jar A, and hence this conductor is effectually protected from injury and may be employed for lifting the carbon electrode out from the battery-cell.

It will now be understood that the active material can be introduced in a loose condition into the cup-shaped carbon electrode and placed in the bottom of the jar, and then the other electrode B is suspended over the materials in the cup-shaped carbon electrode, and the electric current will circulate through the cell between the electrode B and the electrode C, the action being uniform, or nearly so, because there is a nearly-uniform distance between the inner surfaces of the carbon electrode and the surfaces of the zinc electrode B. Hence there will not be any concentration of current at any one point, tending to injure any portion of the battery-cell.

This improvement is available in battery-cells where only a carbon and a zinc electrode are employed; but where a depolarizing material is used, such as black oxid of manganese or any other known material, the same is introduced into the carbon cup. When materials such as bisulfate of soda and chlorate of soda are employed, as in the application, Serial No. 691,133, filed by H. Blumenberg, Jr., the same are held by the cup between the two electrodes and in position to come into active operation.

We claim as our invention—

1. The carbon electrode in the form of a cup having through the rim at one place a hole for the free passage of the conductor and its insulating-covering, a channel in the bottom of the carbon electrode and a connection between the end of the conductor and the bottom of the carbon electrode, substantially as set forth.

2. The combination in a battery-cell with the jar and suspended electrode and a conductor having an insulating-covering for the second electrode, of a carbon cup forming the second electrode and having a vertical hole through the rim thereof sufficiently large for the free passage of the conductor and its insulating-covering, there being a channel in the bottom of such carbon electrode for the reception of the conductor and its covering, the end of the conductor being passed into a hole in the carbon electrode and secured by a plug of lead or similar material and protected by resinous material over the lead plug and the end of the insulating-covering and within the channel in the bottom of the carbon electrode, substantially as set forth.

Signed by us this 9th day of March, 1899.

HENRY BLUMENBERG, JR.
  FREDK. C. OVERBURY.

Witnesses:
  GEO. T. PINCKNEY,
  E. E. POHLÉ.